United States Patent [19]

Harman et al.

[11] Patent Number: 5,095,195
[45] Date of Patent: * Mar. 10, 1992

[54] AUTOMATED VIDEOCASSETTE DISPENSING TERMINAL WITH RESERVATION FEATURE

[75] Inventors: Robert R. Harman, Seaford, Del.; Bruce C. Joslyn, Madison, Conn.

[73] Assignee: Thru-The-Wall Corporation, Chagrin Falls, Ohio

[*] Notice: The portion of the term of this patent subsequent to May 7, 2008 has been disclaimed.

[21] Appl. No.: 293,972

[22] Filed: Jan. 6, 1989

Related U.S. Application Data

[63] Continuation-in-part of Ser. No. 227,618, Aug. 3, 1988, Pat. No. 5,013,897.

[51] Int. Cl.⁵ .................. G06F 15/24; G06F 15/20
[52] U.S. Cl. ............................ 235/381; 235/383; 235/375; 364/407
[58] Field of Search ............... 235/375, 380, 381, 382, 235/383, 385; 364/400, 401, 403, 407, 410, 479; 340/825.35; 221/88

[56] References Cited

U.S. PATENT DOCUMENTS

| | | | |
|---|---|---|---|
| 4,141,078 | 2/1979 | Bridges et al. | 235/385 |
| 4,812,629 | 3/1989 | O'Neil et al. | 235/383 |
| 4,858,743 | 8/1989 | Paraskevakos et al. | 221/88 |
| 4,866,661 | 9/1989 | de Prins | 235/381 |

Primary Examiner—Stuart S. Levy
Assistant Examiner—Robert Weinhardt
Attorney, Agent, or Firm—Ostrolenk, Faber, Gerb & Soffen

[57] ABSTRACT

A system for renting pre-recorded videocassettes in which an automatic videocassette dispensing terminal communicates with and becomes part of a store's computerized videocassette rental system. The store's computer receives and compiles information relating to customer rentals from both the automatic videocassette dispensing terminal and the manned point-of-sale terminals in the store. The automatic videocassette dispensing terminal projects through an exterior wall of the video store to provide 24-hour operation. Videocassettes can be reserved and held in the terminal for pickup by the customer after hours.

4 Claims, 6 Drawing Sheets

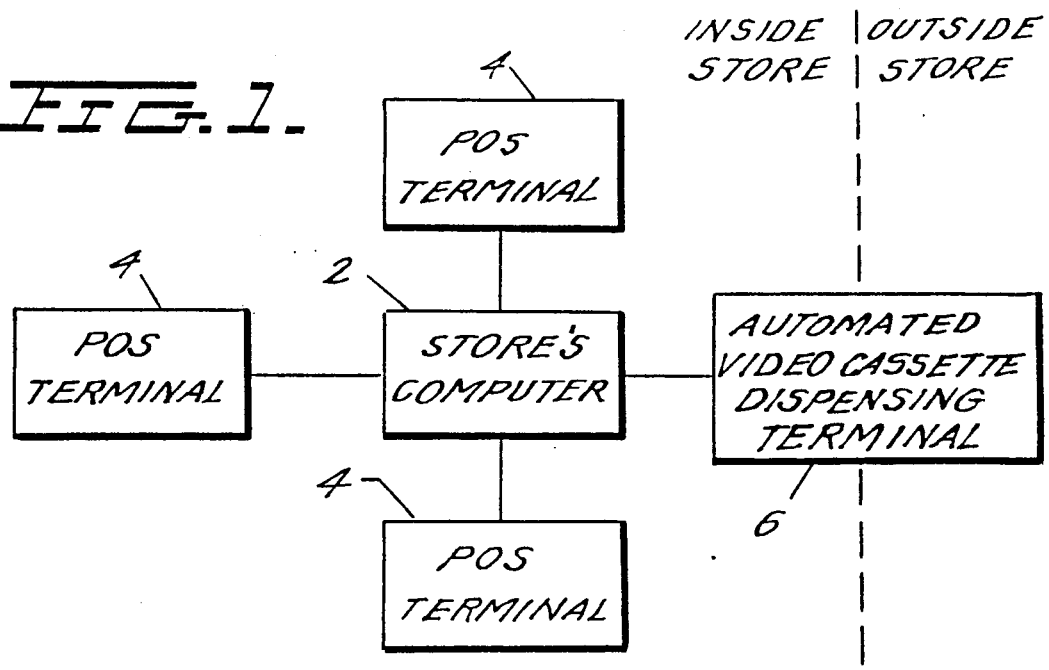

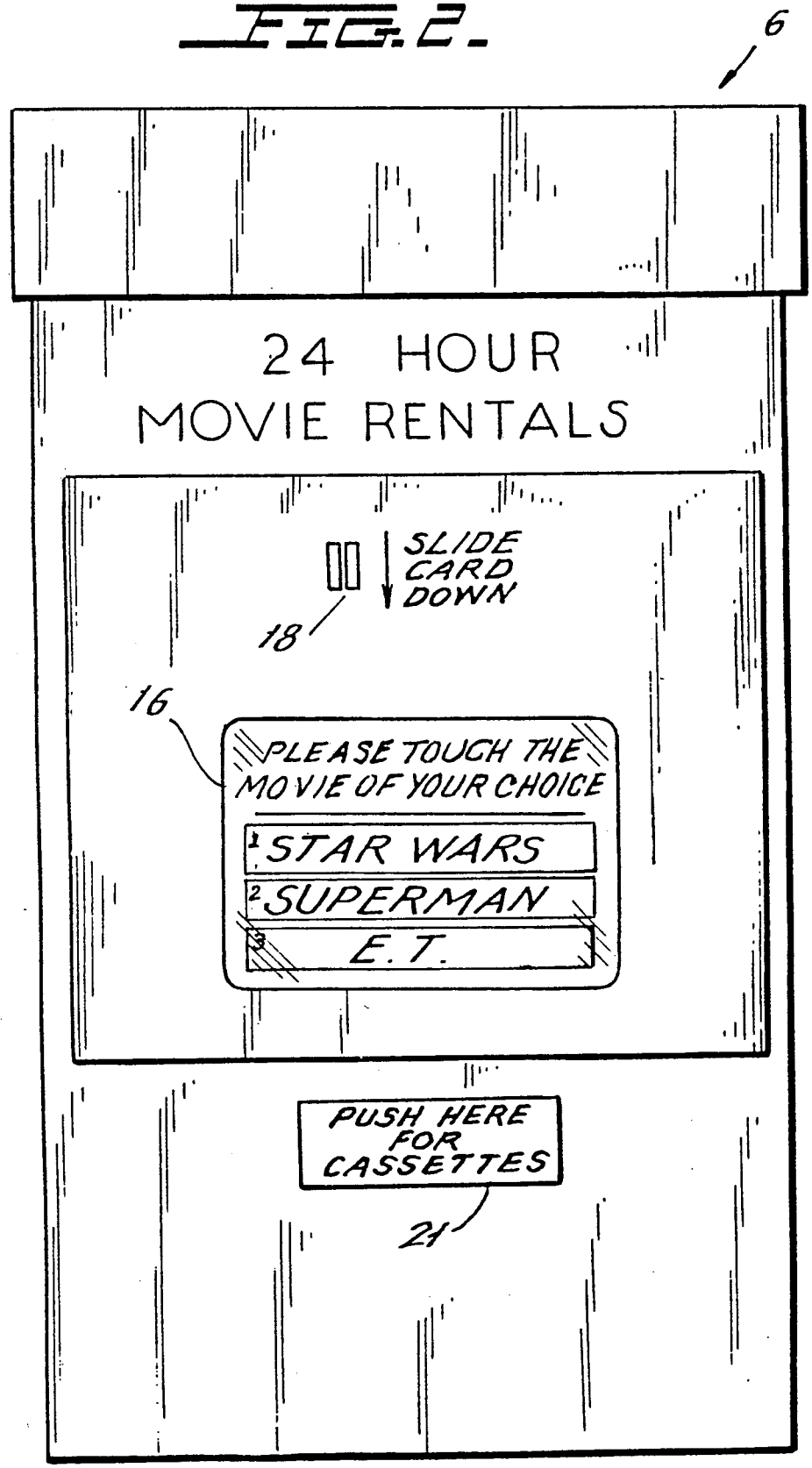

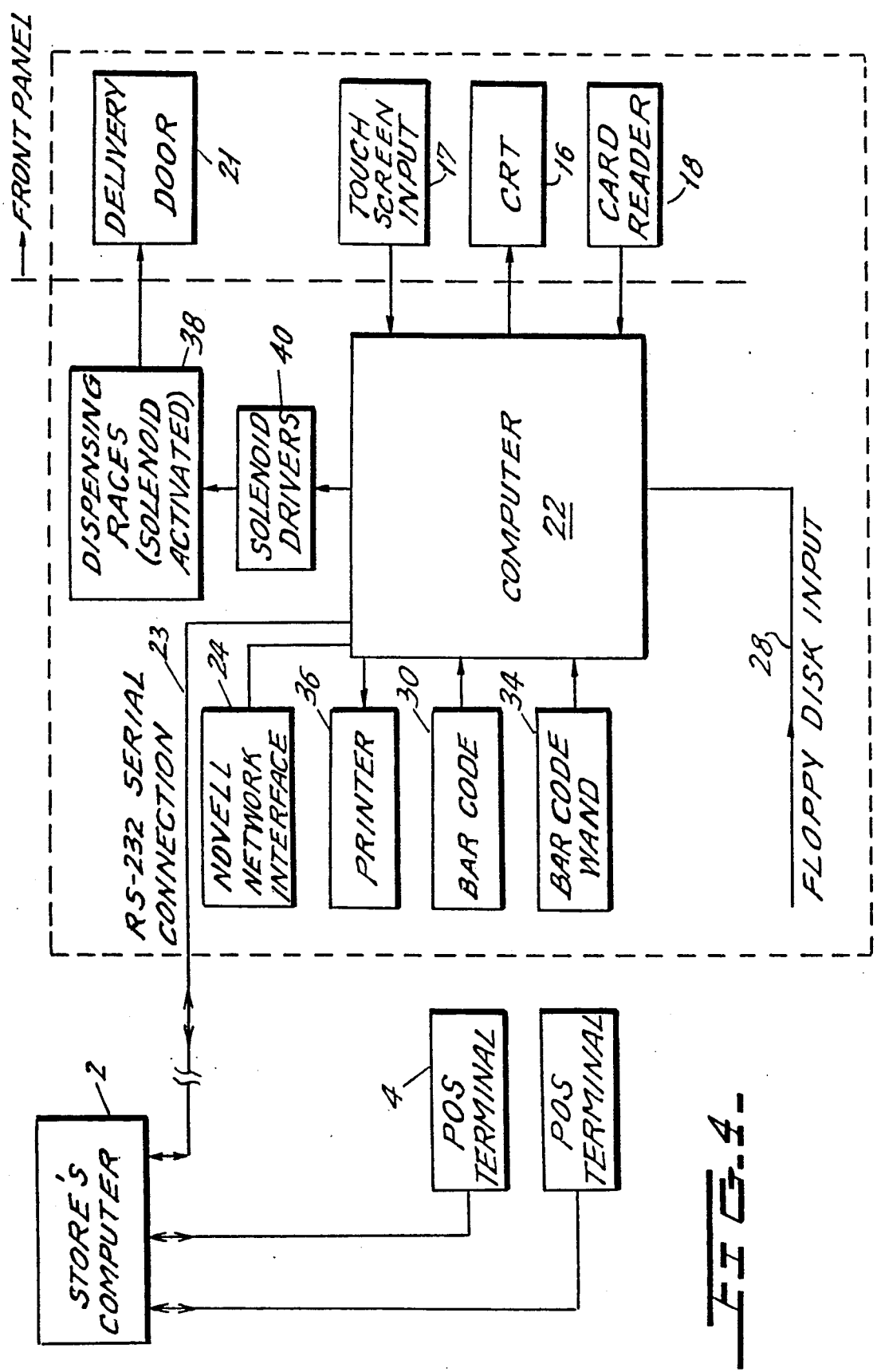

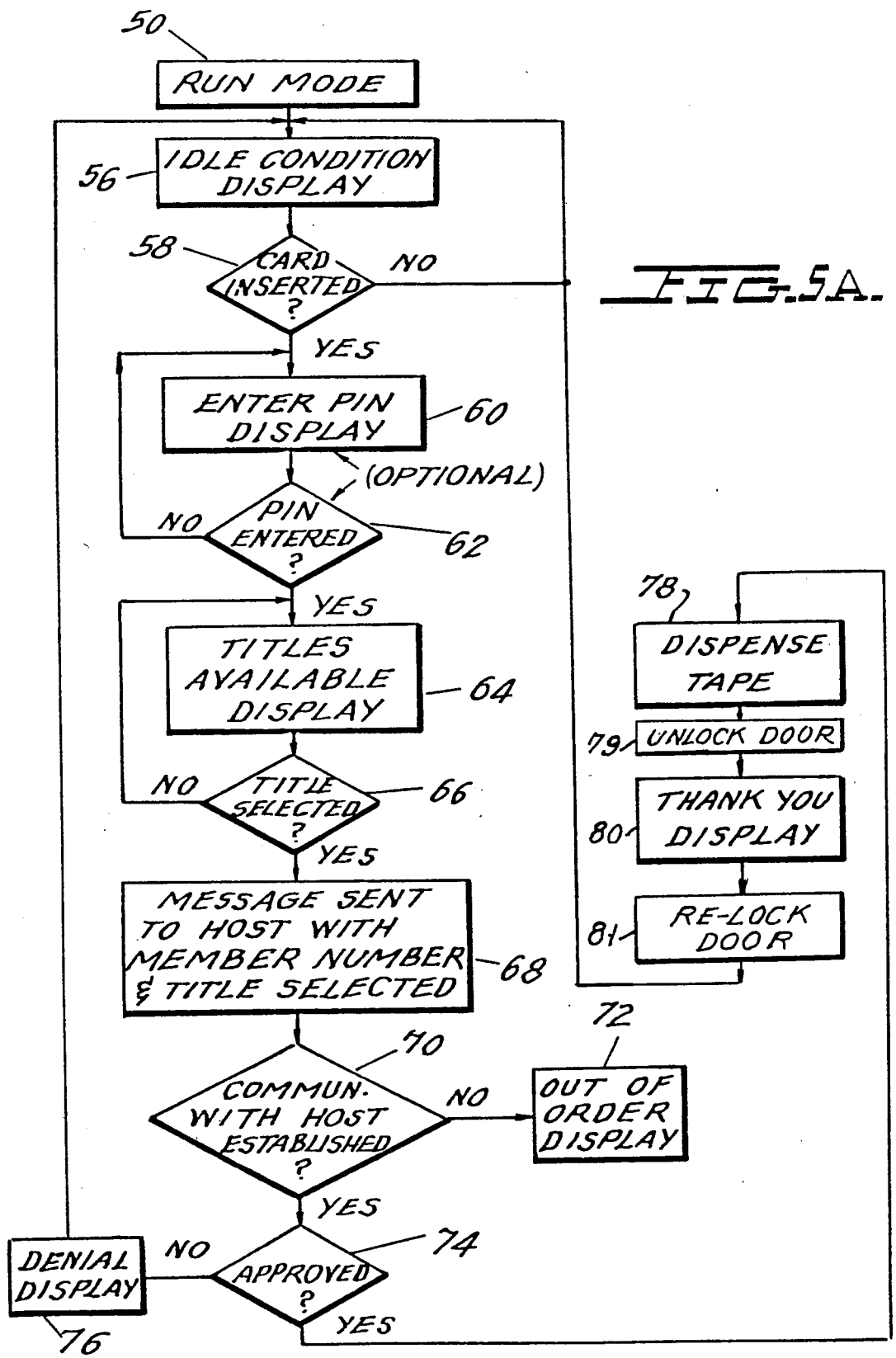

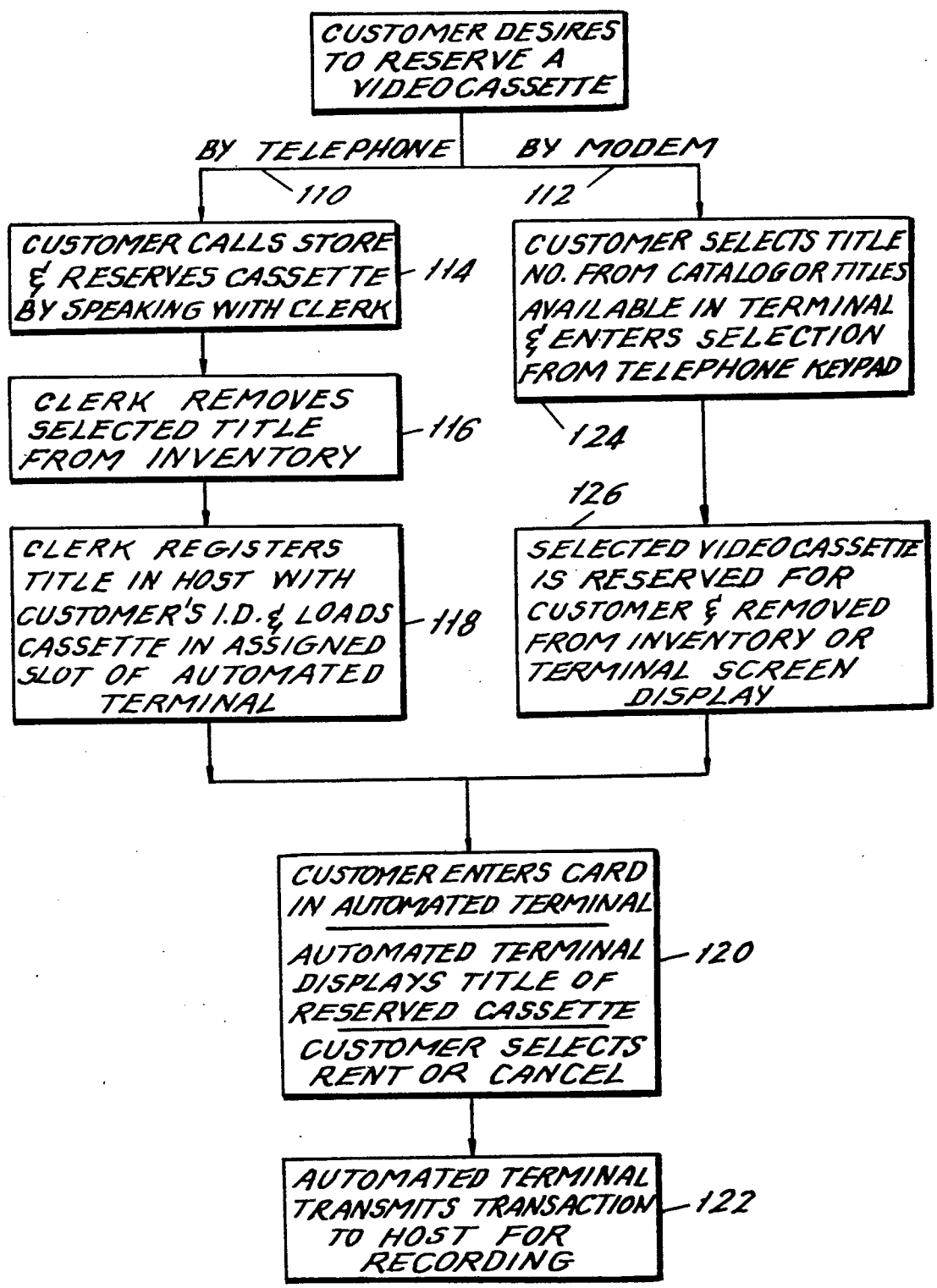

AUTOMATED VIDEOCASSETTE DISPENSING TERMINAL WITH RESERVATION FEATURE

RELATED APPLICATION

This application is a continuation-in-part of U.S. patent application Ser. No. 227,618, filed Aug. 3, 1988 now U.S. Pat. No. 5,013,897.

BACKGROUND OF THE INVENTION

1. Field of the Invention

The present invention relates generally to a computerized video rental system which includes not only point-of-sale terminals, but also a videocassette dispensing terminal. More specifically, the invention relates to such a system with a videocassette reservation feature.

2. Description of the Related Art

The rental of videocassettes is becoming increasingly popular as more and more individuals and families acquire videocassette recorders. Typically, an individual seeking to rent cassettes purchases, or is assigned at no charge, a membership at a particular rental store or chain of rental stores. Membership establishes that the store is willing to loan valuable pre-recorded videocassettes to a person who will be responsible for returning the pre-recorded videocassette within or close to the rental period. Once such a membership has been obtained, the individual is free to browse through the collection of available pre-recorded videocassettes on display at the store, and choose from among the available cassettes for overnight rental at a prescribed rental rate. Ordinarily, the individual will take the empty jackets of the desired cassettes to the rental counter and the store clerk will retrieve the corresponding cassettes, if available. Alternatively, "live merchandise" (pre-recorded videocassettes left in their protective jackets) is displayed on the store's shelving and secured by a system of stickers and doorway detectors, in which case the customer hands the desired cassettes to the store clerk. In either case, in order to register the rental transaction, the store clerk proceeds to enter both the individual's membership number and the cassettes being rented into the store's videocassette rental system. Such rental systems, whether manual or computerized, must minimally keep track of:

(1) the customer who made the rental;
(2) the title rented (and preferably the copy number of that title);
(3) when the rental occurred; and
(4) when the videocassette was due back and when it was actually returned.

The rental store must keep track of the above information so that the proper rental fee can be calculated (either manually or automatically) when the cassette is returned (even if the fee is paid in advance). Moreover, it is important for the rental store to maintain accurate inventory, not only of which cassettes remain in stock, but of cassettes which have been renting most often so that additional copies of frequently requested titles can be purchased to ensure an adequate supply, and so that slow renting titles can be sold while they still have value.

In recent years, most video store rental systems have become computerized. In such computerized systems, rental and return transactions are entered by the clerks through point-of-sale (POS) terminals at the store counter, each of which is coupled to the store's host computer.

Unfortunately, however, when the video store closes and the clerks leave, all rental activity must necessarily cease, and yet some customers would be very interested in obtaining a videocassette after the store has closed. Furthermore, 100% of the revenue from a tape that cannot be rented because it is locked in the store is lost profit. Thus, automated videocassette dispensing terminals, analogous to bank automatic teller machines, would be quite valuable to video rental stores.

Although automated videocassette dispensing machines (VDMs) have been built, sold and used in quantity, e.g. U.S. Pat. No. 4,668,150 to Blumberg, these units have never been made, designed or even proposed to work with a store's computerized videocassette rental system. As such, the inventory records they maintain must be merged each day with the records maintained by the store's computerized videocassette rental system, and record-keeping becomes tedious, not only because cassettes are being rented throughout each day, but because titles are constantly being added and deleted from stock as customer preferences change. Generally, because separate inventories are maintained, cassettes rented from a VDM must be returned to that VDM. Thus, the VDM must be capable of mechanically accepting, recognizing, and registering returns, as well as authorizing credit or accepting payment (whether at rental or return). If payment is not made at time of rental or return, the VDM operator must add a billing system resulting in credit authorization, clerical, financial and bad debt burdens. Moreover, whenever a new title is added, it must be separately keyed into both the store's system and the VDM. Similarly, when authorized members are added, they must be keyed into both the store's system and the VDM. VDM's must also provide physical security around the entire machine to protect their expensive contents. For all the above reasons, VDM's are inherently complex, expensive and unreliable.

The concept of providing an automated videocassette dispensing terminal conveniently located in supermarkets, convenience store, office buildings, and apartment buildings for customer use and remote from a central processing location has also been disclosed in the prior art, e.g. in U.S. Pat. No. 4,300,040 to Gould et al. In accordance with the teachings of this patent, the terminal is coupled to a central processing location via a communications link. The terminal supplies the selected videocassette directly to the customer upon acceptance of an order. Customer billing and control of inventory of videocassettes at the terminal are handled at the processing location.

While the above-described system might be preferable over stand-alone VDM's from an inventory management standpoint, the system is not integrated with a store's existing automated videocassette rental system and the corresponding POS terminals manned by clerks. Thus, again, the system must do all the functions of a video store itself, including authorizing rentals, accepting returns and maintaining inventory (which would have to be merged with the store's inventory and membership lists if cassettes are also rented by clerks). Moreover, none of the above prior art systems are configured to permit a customer to reserve a title in advance and pick up the reserved videocassette from a VDM. Thus, a considerable amount of business is lost because customers are unwilling to make frequent trips to the video store, only to find that the desired videocassette has already been rented. Also, even if the store has a VDM, customers that use the VDM to rent videocassettes after the store closes are limited to the particular titles remaining in the VDM at that time. Customers are likely to become frustrated and discontinue such after hours trips to the VDM if all desirable titles stocked in the VDM are continually rented early in the evening.

SUMMARY OF THE INVENTION

The present invention overcomes the above-mentioned deficiencies of the prior art by providing a system in which an automated videocassette dispensing terminal becomes part of a store's automated videocassette rental system by communicating directly with the store's host computer. Thus, the present invention is essentially an add-on to the store's existing computerized rental system, needing more help from the store's host computer than, but functioning identically to, a manned POS terminal.

The system of the present invention maintains rental authorization control, inventory accounting, and rental calculations in the store's computerized videocassette rental system, while allowing 24-hour rentals through the automatic videocassette dispensing terminal. The present invention thus, for the first time, takes advantage of the existing capability of the store's host computer to store and process customer rental and inventory information from files which already are maintained routinely by trained clerks. Thus, the automated rental system of the present invention, and the automated videocassette dispensing terminal used therein, are much simpler, less expensive, and more reliable than the VDM systems described in the prior art.

Inventory accounting and rental history accounting are simplified in accordance with the present invention since only one computer (the store's host computer) compiles rental information, and no end-of-day merging is required. The system of the present invention is also advantageous from a business standpoint. Since the automated videocassette dispensing terminal must be custom designed to work with each computerized videocassette rental system, it is natural for it to also be sold, installed, and warranted by the individual manufacturers of computerized video rental systems. The automated videocassette dispensing terminal can be sold by a computerized video rental system manufacturer to a store owner either as an add-on to the store owner's existing computerized point-of-sale system (made by that same manufacturer) or in a package with a new point-of-sale system. In the former case, the store owner has the comfort of knowing that: (1) the automated terminal will fit and not damage his existing system, and (2) he can still use only one videocassette rental system and will not have to combine membership lists and inventories.

The automated videocassette dispensing terminal used in the system of the present invention can communicate with the host computer either through a local area network or by means of multi-user architecture. In the preferred embodiment of the invention, the automated terminal replaces an existing door or window of the rental store, or, if a door or window is not available, the terminal projects through the front wall of the store. The former type of installation advantageously in most cases requires no building permit and is usually not considered a leasehold improvement. The terminal is preferably hard-wired to the store's host computer. Obviously, however, the 24-hour automated terminal could be situated in any desired location, and could communicate to the store's host computer via infrared, RF, cable, telephone, fiber optics, or any other appropriate signal transmission technique.

Advantageously, the automated videocassette dispensing terminal of the present invention can be used to dispense videocassettes which have been reserved in advance by a customer. The use of an automatic videocassette dispensing terminal for reservation purposes simplifies the handling of reserved videocassettes, because once the cassette is loaded into the machine, it is never touched again by the store. The use of an automatic videocassette dispensing terminal to dispense reserved videocassettes also relieves the store's clerks from having to service those customers who arrive to pick up their reserved cassettes during the store's late afternoon weekend "rush hours".

Moreover, once it is loaded into the automatic videocassette dispensing terminal, the reserved cassette becomes available for 24-hour pick-up by the customer. Thus, the present invention for the first time allows a customer to choose a videocassette to be rented from the store's entire inventory, and pick up that cassette after the store has closed.

BRIEF DESCRIPTION OF THE DRAWINGS

These and other objects and features of the present invention will become apparent to those skilled in the art from the following description when taken in conjunction with the following drawings.

FIG. 1 is an overall block diagram of the present invention.

FIG. 2 is an illustration of the front face of the automated videocassette dispensing terminal which is preferably used in the system of the present invention;

FIG. 3 illustrates the automated videocassette dispensing terminal projecting through the front window of a video store in the preferred embodiment of the invention;

FIG. 4 is a block diagram of the system architecture including the main components of the present invention;

FIGS. 5A and 5B are a flow chart of the software which controls the automated renting sequence and service sequence of the videocassette dispensing terminal of the present invention; and FIG. 6 is a flow chart of the reservation feature of the present invention.

DETAILED DESCRIPTION OF THE PREFERRED EMBODIMENT

Figure 5B:
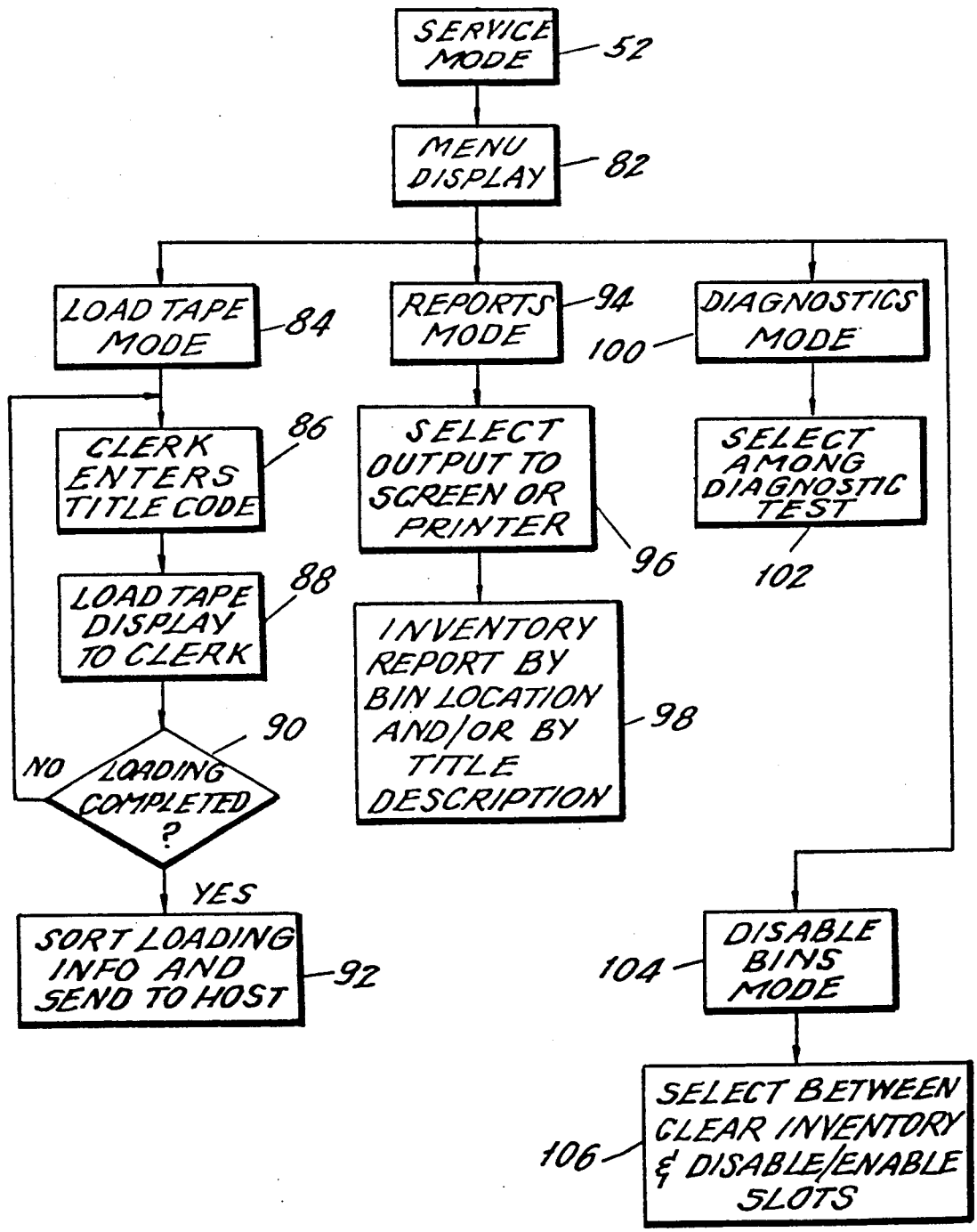

Referring first to FIG. 1, an overall system block diagram is shown in which a store's host computer 2 is coupled to a number of POS terminals 4 inside the store. POS terminals 4 are manned by clerks who enter customer identification information and videocassette identification information into computer 2 through terminals 4 each time a videocassette is rented.

In accordance with the present invention, an automated videocassette dispensing terminal 6 is also coupled to computer 2. As shown in FIG. 1, the automated terminal 6 preferably extends through the store structure so that is accessible from outside the store and can be used on a 24-hour basis by rental customers.

Referring now to FIG. 2, the automatic videocassette dispensing terminal 6 is shown projecting through the front window of a video store 11. Since the back of the machine sits inside the store, only the front face of the machine need be made weather-proof and resistant to vandalism and theft.

Advantageously, the machine is designed to be mounted onto and supported entirely by a ¾ inch plywood panel which replaces an entire glass pane of the video store. Thus, installation of the machine is relatively simple and inexpensive, particularly as compared to ATM's which must be mounted into concrete or brick structures for security reasons.

A CRT screen 16, visible from the front panel of the automated terminal 6, displays the titles available for rent, and for which the customer's identification indicates that he or she is authorized to rent (some families will request restrictions that prevent rental of "R" or "X" rated films). The front panel of the automated terminal 6 also has a bar code reader or a magnetic stripe reader 18, through which the individual is instructed to slide his membership or credit card. As described in further detail later, the machine reads the information on the membership card and sends this information immediately to the store's computer for approval.

The CRT screen 16 is mounted in a holder which pivots or swivels so that the screen can either face toward the front of the terminal for customer use (as shown in FIG. 2) or toward the back of the machine (not shown) where it can be viewed by the store's clerk during service operations (described later). When CRT 16 faces toward the front of the terminal, it rests behind a touch screen 17, which the user touches at appropriate locations in accordance with instructions presented on screen 16 to highlight and select a cassette that he or she wishes to rent. Once the customer has identified a title he or she wishes to rent, and the automatic videocassette dispensing terminal 6 has received approval from the host computer 2, the appropriate videocassette is released from its race and falls into a drawer behind a delivery door 21, from which it may be removed by the customer.

The electronics of the automated videocassette dispensing terminal 6 are relatively simple because most of the data processing is done by the host computer 2. As shown in FIG. 4, the system architecture is controlled by a computer 22, which is preferably IBM PC/XT compatible, and is equipped with 640 Kb RAM, and dual 3½ inch floppy disk drives. This computer controls both the RUN function and the SERVICE function, both of which are described in further detail below. Computer 22 sends the user data in its original raw form and videocassette's numeric code to host computer 2 over an RS-232 serial connection 23. Optionally, a Novell network interface 24 may be used for communication between the two computers. If the store's videocassette rental system includes a credit card verification procedure, verification will be done by computer 2.

Personal computer 22 is loaded with overall system software via floppy disk input 28. The clerk chooses from among the service function options (described below) through bar code 30. The instructions and menu for the SERVICE mode are displayed on CRT 16. When the store clerk adds or removes videocassettes from the inventory of the dispensing terminal 6, he or she wands the tapes in or out with bar code wand 34, which then sends the tape number to computer 22 which relays it to host computer 2. If a videocassette is being added, host computer 2 sends the title back to computer 22, and computer 22 files the information for future display. If a videocassette is removed, its title is deleted from the display file of computer 22. Printer 36 can be activated by keyboard 30 to print out service test results.

Computer 22 also controls the actual dispensing of videocassettes which are stored in dispensing races 38. In order to dispense a tape, computer 22 activates a specific solenoid driver 40 to release by gravity feed the appropriate cassette from dispensing races 38, from which it drops to delivery door 22 for retrieval by the customer.

As mentioned earlier, the front panel of the automated terminal 6 also includes a touch screen 17, and a card reader 18 to be used by the consumer in ordering desired videocassettes. No receipt is provided to the customer for rentals, and the automated videocassette dispensing terminal does not accept returns. Returns can be accepted either by a clerk at a POS terminal in the store or, after hours, through a drop slot. If the customer uses a drop slot, the return of the videocassette is registered by a clerk at a POS terminal 4 after the store opens the next day. Eliminating the automated return feature greatly simplifies the mechanics of the automated videocassette dispensing terminal, resulting in greater reliability and a reduction in cost. The procedure of encouraging returns in-person also gives the store better control over returns, allowing adjustments of overtime charges, etc. based upon particular circumstances. Moreover, inperson return gets the customer back into the store with its large display area, where he or she can be enticed to rent another videocassette.

The software which controls the above-described hardware will now be described, with reference to the software flow chart shown in FIGS. 5A and 5B. The software has two operating modes; the RUN MODE 50 for customer rentals and the SERVICE MODE 52 for all clerk functions. The software mode is controlled by a bar code wand 34 inside the rear access doors of the terminal. When the rear access doors of the automated videocassette dispensing terminal 6 are closed, the swipe reader 18 is activated and the service wand is deactivated. Conversely, when the doors are opened, a switch deactivates swipe reader 18 and activates the service wand.

The RUN MODE, illustrated in 5A, is directed to the CRT 16 in its outside display position. In the idle condition 56, the screen displays:

"TO RENT A TAPE, INSERT YOUR MEMBERSHIP CARD INTO THE CARD SLOT . . . THEN PULL DOWN AS SHOWN."

The software then waits for a card to be inserted at step 58. When a card is entered, the CRT screen 16, at step 60, displays an alphabetized listing of titles onhand. Screen 16 can also display price or price category, and possibly MPAA rating ("R"; "PG"; etc.) and genre (comedy, western, sci-fi).

The software then waits at step 62 for the customer to enter the selected title via touch screen 17. After a RENT confirmation is touched by the customer, CRT 16, at step 64, displays:

"PLEASE ENTER YOUR PERSONAL IDENTIFICATION NUMBER."

The unit then again waits for the PIN number to be entered at step 66. If no PIN number is entered, the screen returns to the IDLE display. Once a PIN number has been entered (via touch screen 17), personal computer 22 sends a message to the host computer 2 with the member's identification number and the title code of the tape selected. (step 68). Computer 22 waits for a return signal, at step 70, to ensure that communication with host computer 2 has been established. If automated terminal 6 is unable to contact host 2, the tape is not dispensed and the screen displays, at step 72:

"WE ARE UNABLE TO CONTACT OUR HOST COMPUTER. THIS DISPENSER IS TEMPORARILY OUT OF ORDER".

The unit then enters a 15 second time-out and then switches to an out of order condition until communication with the host computer 2 is restored. In this out of order condition, the screen displays:

"TEMPORARILY OUT OF ORDER. SORRY FOR THE INCONVENIENCE. PLEASE TRY AGAIN LATER."

If communication with the host is successfully established, the unit waits to see if the transaction has been approved (i.e. if the membership number is authorized). If the host sends back a denial code, the tape is not dispensed and the CRT screen 16 displays, at step 76:

"YOUR RENTAL HAS NOT BEEN APPROVED. PLEASE CHECK WITH THE STORE MANAGER."

The unit then enters a 15 second time-out and returns to the idle screen 56. If the host computer 2 approves the transaction, the tape is dispensed at step 78, the door 21 is unlocked at step 79, CRT screen 16 displays a thank you message 80, the screen returns to idle display 56, and door 21 is locked again at step 81.

The SERVICE MODE, illustrated in FIG. 5B, is directed to CRT 16 (pivoted to its rearwardly facing position) and the bar code menu 30, both of which are accessed inside the rear doors of the unit. After the clerk wands in the SERVICE MODE, the initial screen is the clerk's menu 82, in which the CRT screen 16 displays:

"1. LOAD TAPES
2. REPORTS
3. DIAGNOSTICS
4. DISABLE BINS"

If the clerk selects #1 by wanding that bar code from bar code menu 30, the unit enters the load tapes mode 84 and CRT screen 16 displays:

"ENTER TAPE NUMBER"

The clerk, in step 86, enters the title code by wanding the bar code label on the first cassette to be loaded with bar code wand 34. The screen then displays, as step 88:

"LOAD TAPE INTO BIN XX ENTER NEXT TAPE NUMBER."

To prompt the store's clerk to the assigned bin for the particular cassette to be loaded, the machine also triggers the cassette release solenoid of that bin. Alternatively, an LED can be used to provide a visual identification of the correct bin.

After each title code has been entered, the unit sends the entered number to the host computer 2, and host 2 sends back the corresponding alpha title description. These alpha descriptions and their associated numeric codes are temporarily stored in the memory of personal computer 22 awaiting sorting.

The unit then waits, at step 90, for the wanding to be completed. When the clerk has finished loading the machine, he or she wands a bar code which terminates the LOAD TAPES function, adds the new title descriptions to the on-hand inventory file, and sorts the on-hand inventory file in alphabetical order at step 92.

If the clerk selects #2, the unit enters the report mode 94, and the screen displays

"SEND REPORT TO
1 SCREEN
2 PRINTER"

After the clerk has selected whether the output will be sent to CRT screen 16 or printer 36 at step 96, the selection screen displays:

"REPORTS
1. INVENTORY REPORT BY BIN LOCATION
2. INVENTORY REPORT BY TITLE DESCRIPTION"

Then at step 98, the clerk chooses which of these two reports to receive on the selected output device.

If the clerk selects #3 from menu display 82, the unit enters the diagnostics mode 100 and the screen displays the following types of diagnostics which can be conducted:

"DIAGNOSTICS
1. TEST CRT
2. TEST CARD READER
3. TEST BARCODE READER
4. TEST PRINTER
5. TEST TRIP LEVERS
6. TEST DOOR LOCK"

The clerk, at step 102, selects which of the above steps he or she will run, and the unit executes the appropriate test.

If the clerk selects #4 from the clerk's menu 82, the unit enters the disabled bins mode 104 and the screen displays:

"1. CLEAR INVENTORY
2. DISABLE/ENABLE SLOTS"

The clerk selects one of these options. If the CLEAR INVENTORY option is selected the screen displays:

"1. BY TITLE CODE
2. BY LOCATION RANGE"

If, on the other hand, the disable/enable slots is chosen, the screen displays:

"1. DISABLE SLOT(S)
2. ENABLE SLOT(S)"

The disabled slot routine is used to exclude a defective slot location until it is repaired. A disabled slot is not recognized by the software program. After a defective slot has been repaired, the slot must be enabled for future use.

It should be noted that all screens in the RUN MODE have a 30 second time-out and then return to the idle screen. Also, when the customer is entering his or her PIN number, he or she is given three chances to enter the correct number, and if all three entries are incorrect, the screen returns to the idle screen.

Obviously, the above-described software sequence is only intended to be exemplary, as many different types of screens and customer prompts can be displayed. For example, a preview feature could be added so that, after a customer selects a title but before rental confirmation, he or she can view a graphics representation of the videocassette box, possibly accompanied by audio.

The present invention also has a reservation feature in which the automated videocassette dispensing terminal holds a reserved cassette for customer pick-up. Referring to FIG. 6, a videocassette can be reserved by telephone either manually 110 or by modem communication 112 directly to the store's computer 2. In the first instance, the customer calls into the store, asks the clerk if a particular title is available and, if so, requests that it be reserved (step 114). To make the reservation, the customer gives the clerk his or her ID number. The clerk then removes the cassette box from the store's shelf and registers the cassette itself with the customer's ID in host computer 2 (step 116). (Host computer 2 deems the cassette to have been "rented" at this time as far as billing is concerned). Host computer 2 automatically assigns a particular bin in the automated videocassette dispensing terminal for the reserved cassette and, when the automated terminal is being loaded with cassettes, the CRT screen 8 (along a solenoid trigger or LED light) prompts the store's clerk to load the reserved cassette into the assigned bin (step 118).

When the customer arrives at the store and swipes his membership card into the terminal, host computer 2 recognizes that a cassette is being held for that customer, and the title of the reserved cassette is displayed on CRT 8 for rental confirmation (step 120). Once the reserved tape has been dispensed to the customer, the rental transaction is transmitted to host computer 2 for recordkeeping purposes (step 122).

If the customer prefers (or if the video store is closed), a videocassette can be reserved by modem communication directly with the store's computer 2. If the store is still open, the customer selects a desired title by its number from a catalog, and enters this number via the telephone touchpad (step 124). If the desired cassette is available in the store, it is reserved for the customer electronically and subsequently removed from inventory and loaded into the automatic videocassette dispensing terminal 6 by the store's clerk.

If the store is closed when modem reservation is attempted, the store's computer communicates to the customer which titles are available in automatic videocassette dispensing terminal 6, and the customer enters the associated number of the desired cassette as before (step 124). At this point, the designated cassette is reserved for the customer and removed from the terminal's screen display (step 126). Thus, other customers who walk up to the terminal cannot rent this title, and the customer with the reservation can rest assured that the cassette will be available when he or she arrives for pick-up (steps 120 and 122).

Accordingly, the present invention as described above provides a unique system which provides 24-hour operation for video stores, while maintaining centralized compilation of customer rental and inventory information in the store's existing computer. The system of the present invention advantageously provides many options not available with prior art systems. For example, customers can make reservations for videocassette rentals and, if the reserved cassette is not picked up in-person during the business day, it can be left in the automated videocassette dispensing terminal for pick up later that evening. Similarly, finished photoprints could be left for customer pickup after hours in the automated dispensing terminal of the present invention.

Although the present invention has been described in connection with a preferred embodiment thereof, many other variations and modifications will now become apparent to those skilled in the art without departing from the scope of the invention. For instance, the system of the present invention could be used for dispensing any type of product (e.g. videodisks) which is practical to dispense from an automated terminal, and for which it is desired to maintain a centralized record of both over-the-counter and automated transactions. It is preferred, therefore, that the present invention be limited not by the specific disclosure herein, but only by the appended claims.

What is claimed is:

1. A method for reserving and dispensing rental videocassettes from a video store, comprising the steps of:
    (a) having a customer communicate to the video store reservation information comprising customer identification information and product identification information for each videocassette to be reserved for rental;
    (b) entering said reservation information into a host computer in a point of sale management system of the video store which compiles and stores said reservation information, as well as information relating to videocassette inventory and customer rentals, including time of rental and return of said rental videocassettes, said host computer communicating with:
        (1) at least one manned point of sale terminal for renting and returning said videocassettes which communicates to said host computer said reservation information entered at a manned point of sale terminal by a store clerk when said customer communicates a desired videocassette reservation to said video store by telephone, and
        (2) at least one automated videocassette dispensing terminal for renting videocassettes which operates in accordance with said reservation information which is centrally stored in said host computer;
    (c) loading the reserved videocassette into said automated videocassette dispensing terminal which communicates with said host computer; and
    (d) dispensing said reserved videocassettes from said videocassette dispensing terminal to respective customers for which they are reserved based upon customer identification information inputted to said videocassette dispensing terminal by said customers when they arrive to pick up their reserved videocassettes.

2. A method as recited in claim 1, wherein said customer communicates a desired videocassette reservation directly to said host computer via a modem, and said customer enters said rental information into said host computer.

3. A method as recited in claim 1, wherein, after the store is closed, said customer selects a videocassette to be reserved for rental based upon the titles available in said automated videocassette dispensing terminal, and the reserved videocassette is removed from the list of available titles displayed to subsequent customers making videocassette rental inquiries to said terminal.

4. A method for reserving and dispensing rental products from a rental establishment, comprising the steps of:
    (a) having a customer communicate to the rental establishment reservation information comprising customer identification information and product identification information for each product to be reserved for rental;
    (b) entering said reservation information into a host computer in a point of sale management system of the rental establishment which compiles and stores said reservation information, as well as information relating to product inventory and customer rentals, including time of rental and return of said rental products, said host computer communicating with:
        (1) at least one manned point of sale terminal for renting and returning said rental products which operates in accordance with the reservation information which is centrally stored in said host computer, and
(2) at least one automated rental terminal for renting said reserved rental products which operates in accordance with said reservation information which is centrally stored in said host computer; and
(c) dispensing said reserved rental products from said automated rental terminal to the respective customers for which they are reserved based upon customer identification information inputted to said automated rental terminal by said customers when they arrive to pick up their reserved products.

* * * * *